Patented Sept. 5, 1933

1,925,886

UNITED STATES PATENT OFFICE 1,925,886

MANUFACTURE OF IRON AND STEEL ALLOYS

James C. Vignos, Canton, Ohio

No Drawing. Application April 27, 1931
Serial No. 533,375

6 Claims. (Cl. 75—45)

The invention relates to the manufacture of alloy steels and irons, and more particularly to a process which includes the reduction of a portion of the alloying elements directly from their ores or oxides by an alloy silicide, and the production of iron and steel alloys without the introduction of excess carbon or silicon in the finished alloy.

The improved process to which the invention pertains is particularly applicable to the manufacture of stainless irons and steels wherein a considerable portion of the alloy is introduced into the steel by its direct reduction from an unreduced compound of the alloy, by an alloy silicide, within a steel making furnace.

In all of the present known commercial methods of making the so-called "stainless steels", which contain from twelve per cent to twenty-five per cent chromium, and a low carbon content, with appreciable amounts of other alloys such as nickel, copper, manganese, etc., difficulties arise in the manufacture which increase the cost to such an extent that their application is considerably narrowed down. These difficulties are well known to those versed in the art.

The object of the present improvement is to produce a process for making the so-called "stainless steels" within the prescribed low carbon limits, by overcoming the principal economic difficulties present in the various known processes, by using cheaper raw materials and greatly decreasing the time necessary for the making of a heat of the alloy, and providing an improved and simplified process.

In accordance with the invention, the improved process is carried out in a refining furnace, such as an open hearth furnace or electric furnace of either arc or induction type, preferably in an arc furnace of the well known Heroult design.

The first step in the improved process consists in the melting down of iron or steel scrap in an electric furnace together with a metallic oxide in the form of an ore or roll scale, together with a basic flux. After melting down, the bath can be further decarburized, if necessary. At this point the slag may either be removed or treated with a crushed metallic silicide or other reducing agent to remove the metallic oxides from the slag and reduce its basicity.

The second step in the process consists in adding to the molten bath in the furnace, in a continuous manner, either mechanically or by hand, an excess of a calculated amount of chrome silicide containing more than one per cent chromium and not over .75 per cent carbon, preferably .05 per cent carbon in pulverized form, intimately mixed with an excess of powdered chrome ore or partially reduced chrome ore, and sufficient fine basic flux to produce an approximately neutral slag. This mixture may be added with the power on or off the furnace, as desired.

The reaction between the silicon of the chrome silicide and the chrome ore is extremely rapid, being almost instantaneous when added while the furnace is maintained at sufficiently high temperature. Since the reaction takes place almost instantaneously and completely on the surface of the slag, or at least within the slag, the silicon content of the metal bath is not appreciably increased. In this respect the process differs from all other processes and allows a great reduction in the time necessary for the heat.

As a last step in the process, after all of the chrome silicide, chrome ore and flux mixture has been added, the slag can be treated and the heat finished in any suitable and well known manner.

In carrying out the process in the standard Heroult furnace, it was found necessary or desirable to remove the slag once or twice during the additions of the chrome silicide, chrome ore and flux mixture, as the volume of slag increased to such an extent that it was necessary to remove at least a portion of it in order to safely make further additions to the slag.

The invention has been carried out by continuously adding the chrome silicide, chrome ore and flux mixture to the furnace a shovelful at a time, the power remaining on during the entire process, and has also been successfully carried out by shutting off the power to the furnace at stated intervals and adding a portion of the mixture a shovelful at a time during these intervals, the power being then again turned on to the furnace, remaining on for stated intervals between the charging periods.

These two methods of carrying out the process are given below in detail, Example 1 being a complete disclosure of the method in which the process is carried out by leaving the power to the furnace on throughout the entire heat, the mixture being continuously added a shovelful at a time, while Example 2 describes in detail the method of carrying out the process by shutting off the power at stated intervals and adding certain portions of the mixture a shovelful at a time during these periods.

*Example 1*

Ten thousand pounds of low carbon steel scrap, 200 pounds of chrome ore and 200 pounds of burnt lime were melted down in a six-ton Heroult furnace. After melting down, the bath was treated with 200 pounds of iron ore to bring the carbon content down to .04 per cent. To the slag upon this bath, without treating the same with ferrosilicon, alloy silicide or other reducing agent, the following powdered mixture was added continuously, a shovelful at a time without breaking the current input to the furnace: 5500 pounds of chrome ore containing 41.75 per cent chrome oxide; 2750 pounds of chrome silicide containing 46 per cent chrome, 35.64 per cent silicon and .32 per cent carbon; and 2560 pounds of well burnt lime.

All excepting 400 pounds of this mixture was added to the furnace, continuously a shovelful at a time, within a period of two hours and fifty minutes. Fifteen minutes after the last addition of the mixture to the furnace the metal analyzed 16.64 per cent chrome, .14 per cent silicon and .24 per cent carbon; and the slag analyzed 12.67 per cent magnesia, 7.86 per cent alumina, 32.48 per cent lime, 26.75 per cent silica, 3.70 per cent iron oxide and 7.50 per cent chromite.

From this example it is found that the slag volume can be reduced by using a better grade of chrome ore and the lime can be reduced greatly. The carbon content is dependent upon the carbon in the chrome ore and chrome silicide. The silicon content of the metal proves that the reaction takes place within the slag layer and is practically instantaneous. The slag composition can be controlled by the analysis and amounts of chrome ore and lime used.

*Example 2*

Ninety-five hundred pounds of low carbon steel scrap, 100 pounds of chrome ore, 100 pounds of iron ore and 100 pounds of lime were melted down in a Heroult furnace.

After melting down, the slag was treated with powdered ferrosilicon. The metal analyzed as follows: carbon .035 per cent, chrome .22 per cent and silicon .10 per cent. To the slag upon this bath was added a shovelful at a time, the following powdered mixture: 2100 pounds of chrome silicide containing 46.75 per cent chrome, 35.6 per cent silicon and .32 per cent carbon; 4000 pounds of chrome ore containing 57.62 per cent chrome oxide; and 500 pounds of lime.

This mixture was added to the furnace in seven lots of about 900 pounds each during periods while the power to the furnace was off and the electrodes were raised. Each lot of about 900 pounds was charged by hand shoveling in a period of about five minutes. After each lot was charged the power was again put on for approximately twelve minutes. From the time the power was shut off for charging the first lot until it was put on after the last lot was charged was one hour and forty minutes. Fifteen minutes after the last lot of the mixture was added, the metal analyzed 16.69 per cent chromium, .11 per cent carbon and .14 per cent silicon.

The above examples are given to illustrate the workability of the process only and are not intended to limit the scope of the invention. It is obvious that with the varying analyses of the chrome ore and chrome silicide, and by employing them in varying amounts with the basic flux, the slag analysis can be made whatever may be desirable.

While two specific forms of the improved process have been described, it should be understood that the invention is applicable to other alloys having similar characteristics and to refining furnaces of either the electric or open hearth types.

For example, manganese silicide and manganese ore may be substituted for the chrome silicide and chrome ore to make low carbon manganese steel; or manganese silicide and chrome ore may be used to make a steel containing chromium and manganese with a low carbon content, or the reverse may be used without departing from the spirit of the invention. Further, nickel silicide can be used with chrome ore for making nickel chrome steels or the reverse can be used. Mixtures of various silicides and ores can be used to bring about any desired analysis.

In each of the two specific examples described above, one step in the process comprised the addition of a mixture including ore and silicide. It should be understood that the invention may also be carried out in the same manner as above described except that partially reduced ore may be substituted for the ore in the addition. For this purpose the ore may be partially reduced by heating it to the proper temperature, in the presence of insufficient carbon for complete reduction of the ore. This partially reduced ore is preferably added, while hot, to the molten bath, together with the silicide.

I claim:

1. The manufacture of low carbon iron and steel alloys which consists in charging into a suitable furnace the iron or steel to be alloyed, a metallic oxide and basic flux material, melting down the charge and obtaining a molten metal bath low in carbon having a basic slag layer thereover, then adding to said slag layer an intimate mixture of the desired alloy silicides containing over .10 per cent and under .50 per cent carbon, alloy oxides in an amount substantially twice the weight of the alloy silicide and a basic flux material, the amount of the total reducible oxides in the mixture being in excess of and not more than ten per cent in excess of that theoretically required to oxidize the silicon contained in the alloy silicides of the mixture, the said mixture being charged to the slag layer at such a rate and in such form that the reaction between the alloy silicides and alloy oxides takes place completely within the slag layer so that the metal bath under the slag layer will contain at all times less than one and one-half per cent of silicon.

2. The manufacture of low carbon iron and steel alloys which consists in charging into a suitable furnace the iron or steel to be alloyed, a metallic oxide reducible by carbon and burned limestone, melting down the charge and obtaining a molten bath low in carbon having a basic slag layer thereover, then adding to said slag layer an intimate mixture of chrome silicide containing over .10 per cent and under .50 per cent carbon, chrome ore in an amount substantially twice the weight of the chrome silicide and burned limestone, the amount of reducible oxides in the chrome ore being in excess of and not more than ten per cent in excess of that required to oxidize the silicon contained in the chrome silicide in the mixture, the said mixture being added to the slag layer in small quantities and at such a rate that the slag layer is not chilled appreciably and that the reaction between the chrome silicide and chrome ore takes place completely within the slag layer so that the metal bath under the slag layer will contain at all times less than one and one-half per cent of silicon.

3. The manufacture of low carbon iron and steel alloys which consists in charging into a suitable furnace the iron or steel to be alloyed, a metallic oxide and basic flux material, melting down the charge and obtaining a molten metal bath low in carbon having a basic slag layer thereover, then adding to said slag layer an intimate mixture of the desired alloy silicides having over .10 per cent and less than .50 per cent carbon, alloy oxides in an amount substantially twice the weight of the alloy silicides and a basic flux material, the amount of the total reducible oxides in the mixture being in excess of and not more than ten per cent in excess of that theoretically required to oxidize the silicon contained in the alloy silicides of the mixture, the said mixture being charged to the slag layer at such a rate and in such form that the reaction between the alloy silicides and alloy oxides takes place completely within the slag layer so that the metal bath under the slag layer will contain at all times less than one and one-half per cent of silicon.

4. The manufacture of low carbon iron and steel alloys which consists in charging into a suitable furnace the iron or steel to be alloyed, a metallic oxide reducible by carbon and burned limestone, melting down the charge and obtaining a molten bath low in carbon having a basic slag layer thereover, then adding to said slag layer an intimate mixture of manganese silicide containing over .10 per cent and under .50 per cent carbon, manganese ore in an amount substantially twice the weight of the manganese silicide and burned limestone, the amount of reducible oxides in the manganese ore being in excess of and not more than ten per cent in excess of that required to oxidize the silicon contained in the manganese silicide in the mixture, the said mixture being added to the slag layer in small quantities and at such a rate that the slag layer is not chilled appreciably and that the reaction between the manganese silicide and manganese ore takes place completely within the slag layer so that the metal bath under the slag layer will contain at all times less than one and one-half per cent of silicon.

5. The manufacture of low carbon iron and steel alloys which consists in charging into a suitable furnace the iron or steel to be alloyed, a metallic oxide reducible by carbon and burned limestone, melting down the charge and obtaining a molten bath low in carbon having a basic slag layer thereover, then adding to the said slag layer an intimate mixture of manganese silicide, chrome ore and burned limestone, the amount of reducible oxides in the chrome ore being not more than ten per cent in excess of that required to oxidize the silicon contained in the manganese silicide in the mixture, the said mixture being added to the slag layer in small quantities and at such a rate that the slag layer is not chilled appreciably and that the reaction between the manganese silicide and chrome ore takes place completely within the slag layer so that the metal bath under the slag layer will contain at all times less than five per cent of silicon.

6. The manufacture of low carbon iron and steel alloys which consists in charging into a suitable furnace the iron or steel to be alloyed, a metallic oxide reducible by carbon and burned limestone, melting down the charge and obtaining a molten bath low in carbon having a basic slag layer thereover, then adding to the said slag layer an intimate mixture of chrome silicide, manganese ore and burned limestone, the amount of reducible oxides in the manganese ore being not more than ten per cent in excess of that required to oxidize the silicon contained in the chrome silicide in the mixture, the said mixture being added to the slag layer in small quantities and at such a rate that the slag layer is not chilled appreciably and that the reaction between the chrome silicide and manganese ore takes place completely within the slag layer so that the metal bath under the slag layer will contain at all times less than five per cent of silicon.

JAMES C. VIGNOS.